(12) United States Patent
Lindblad et al.

(10) Patent No.: US 10,317,614 B1
(45) Date of Patent: Jun. 11, 2019

(54) SSL LIGHTING APPARATUS

(71) Applicant: AUTOMATED ASSEMBLY CORPORATION, Lakeville, MN (US)

(72) Inventors: Scott Lindblad, Chaska, MN (US); David Neuman, Randolph, MN (US); Aaron M. Anderson, Bloomington, MN (US); Alex Ampe, Bloomington, MN (US)

(73) Assignee: Automatad Assembly Corporation, Lakeville, MN (US)

( * ) Notice: Subject to any disclaimer, the term of this patent is extended or adjusted under 35 U.S.C. 154(b) by 198 days.

(21) Appl. No.: 15/458,271

(22) Filed: Mar. 14, 2017

(51) Int. Cl.
| F21V 8/00 | (2006.01) |
|---|---|
| F21V 19/00 | (2006.01) |
| F21V 23/06 | (2006.01) |
| H01R 25/16 | (2006.01) |

(52) U.S. Cl.
CPC .......... *G02B 6/0083* (2013.01); *F21V 19/003* (2013.01); *F21V 23/06* (2013.01); *G02B 6/009* (2013.01); *G02B 6/0036* (2013.01); *G02B 6/0055* (2013.01); *G02B 6/0068* (2013.01); *G02B 6/0073* (2013.01); *H01R 25/162* (2013.01)

(58) Field of Classification Search
CPC .. G02B 6/0083; G02B 6/0036; G02B 6/0055; G02B 6/0068; G02B 6/0073; G02B 6/009; F21V 19/003; F21V 23/06; H01R 25/162
USPC ....................................................... 362/612
See application file for complete search history.

(56) References Cited

U.S. PATENT DOCUMENTS

| 4,714,983 A | 12/1987 | Lang |
| 5,562,971 A | 10/1996 | Tsuru et al. |
| 5,598,382 A | 1/1997 | Wilson et al. |
| 5,609,778 A | 3/1997 | Pulaski et al. |
| 5,621,274 A | 4/1997 | McGuigan |
| 5,811,930 A | 9/1998 | Krafcik et al. |
| 5,817,243 A | 10/1998 | Shaffer |

(Continued)

FOREIGN PATENT DOCUMENTS

WO    WO2011/110175 A2    9/2011

OTHER PUBLICATIONS

Brooks et al., "Plasma Polymerization: A Versatile and Attractive Process for Conformal Coating," SMTA International Conference Proceedings (Oct. 14, 2012).

(Continued)

*Primary Examiner* — Bryon T Gyllstrom
(74) *Attorney, Agent, or Firm* — Crawford Maunu PLLC

(57) ABSTRACT

A disclosed lighting apparatus includes a flex-circuit, a frame, and a light-diffusive panel. The flex-circuit includes a power bus having first and second portion of opposite polarity disposed parallel to outer edges of the flex-circuit, and solid-state lighting (SSL) elements disposed and connected between the portions of the power bus. A first side of the frame includes a first surface to which a portion of the flex-circuit having the first portion of the power bus is attached, a second surface to which a portion of the flex-circuit having the SSL elements is attached, and a third surface to which a portion of the flex-circuit having the second portion of the power bus is attached. A face of the light-diffusive panel abuts the first surface of the frame, and side of the light-diffusive panel faces the second surface of the frame and light emitting portions of the SSL elements.

20 Claims, 5 Drawing Sheets

(56) References Cited

U.S. PATENT DOCUMENTS

| | | | | |
|---|---|---|---|---|
| 5,821,691 | A | 10/1998 | Richie et al. | |
| 5,830,028 | A | 11/1998 | Zovko et al. | |
| 5,842,297 | A | 12/1998 | Tung | |
| 5,936,264 | A | 8/1999 | Ishinaga | |
| 5,950,340 | A | 9/1999 | Woo | |
| 6,371,637 | B1 | 4/2002 | Atchinson et al. | |
| 6,388,780 | B1 | 5/2002 | Monaghan et al. | |
| 6,624,569 | B1 | 9/2003 | Pennaz et al. | |
| 6,631,558 | B2 | 10/2003 | Burgess | |
| 6,664,645 | B2 | 12/2003 | Kawai | |
| 7,070,301 | B2 | 7/2006 | Magarill | |
| 7,108,414 | B2 | 9/2006 | McCollum et al. | |
| 7,210,838 | B2 * | 5/2007 | Sakurai | G02B 6/0091 349/65 |
| 7,336,895 | B2 | 2/2008 | Okazaki | |
| 7,537,374 | B2 | 5/2009 | Schardt et al. | |
| 7,559,684 | B2 * | 7/2009 | Okuda | G02B 6/0083 362/610 |
| 7,572,031 | B2 * | 8/2009 | Schultz | H05K 1/0203 362/249.02 |
| 7,659,620 | B2 | 2/2010 | Fernandez | |
| 7,679,099 | B2 | 3/2010 | Pang | |
| 7,705,365 | B2 | 4/2010 | Kurokawa et al. | |
| 7,709,851 | B2 | 5/2010 | Bader et al. | |
| 7,717,605 | B2 | 5/2010 | Shibata | |
| 7,762,704 | B2 | 7/2010 | Brychell | |
| 7,850,358 | B2 | 12/2010 | Hamada | |
| 7,922,380 | B2 * | 4/2011 | Park | G02B 6/0085 362/612 |
| 7,959,343 | B2 | 6/2011 | Ijzerman et al. | |
| 7,973,327 | B2 | 7/2011 | West | |
| 7,989,838 | B2 | 8/2011 | Ku | |
| 7,990,512 | B2 * | 8/2011 | Yang | G02B 6/003 345/102 |
| 8,002,436 | B2 * | 8/2011 | Wang | H05K 1/0274 257/98 |
| 8,013,525 | B2 | 9/2011 | Cok et al. | |
| 8,029,163 | B2 | 10/2011 | Chen et al. | |
| 8,031,294 | B2 * | 10/2011 | Kim | G02B 6/0083 349/58 |
| 8,033,684 | B2 | 10/2011 | Marshall et al. | |
| 8,052,303 | B2 | 11/2011 | Lo et al. | |
| 8,061,882 | B2 * | 11/2011 | Bita | B82Y 20/00 362/612 |
| 8,083,238 | B2 | 12/2011 | Borges | |
| 8,235,574 | B2 * | 8/2012 | Hamada | G02B 6/0031 362/612 |
| 8,247,979 | B2 * | 8/2012 | Sun | G02B 6/0068 315/149 |
| 8,322,882 | B2 | 12/2012 | Ward | |
| 8,330,176 | B2 | 12/2012 | Thompson et al. | |
| 8,353,615 | B2 * | 1/2013 | Douglas | G02B 6/0023 362/608 |
| 8,752,995 | B2 * | 6/2014 | Park | H05K 1/0209 362/612 |
| 8,864,357 | B2 | 10/2014 | Kim | |
| 9,128,222 | B1 | 9/2015 | Linblad et al. | |
| 2004/0130019 | A1 | 7/2004 | Chen | |
| 2005/0152146 | A1 * | 7/2005 | Owen | A61L 2/10 362/294 |
| 2008/0101084 | A1 | 5/2008 | Hsu | |
| 2012/0170317 | A1 | 7/2012 | Tsai et al. | |
| 2012/0287371 | A1 | 11/2012 | Oura | |
| 2012/0300495 | A1 | 11/2012 | Kim et al. | |
| 2013/0051067 | A1 | 2/2013 | Chen | |
| 2013/0099275 | A1 | 4/2013 | Pi et al. | |

OTHER PUBLICATIONS

Quinones et al.,"Silicone-Phosphor Encapsulation for High Power White LEDs," Pan Pacific Symposium 2008 Proceedings (Jan. 24, 2008).

* cited by examiner

SSL LIGHTING APPARATUS

FIELD OF THE INVENTION

The disclosed structures generally relate to a solid-state lighting (SSL) apparatus.

BACKGROUND

Solid-state lighting (SSL) apparatuses have semiconductor structures that emit light. Examples of SSL lighting elements include light-emitting diodes (LEDs), semiconductor laser diodes (LDs), organic light-emitting diodes (OLED), polymer light-emitting diodes (PLED), and quantum dots. SSL is becoming more popular due in part to the energy efficient qualities and durability of SSL. Applications for SSL may include advertising signage, decorations, or utility and general purpose lighting.

In some implementations, SSL elements are placed along one or more edges of a light-transmitting panel, and the light-transmitting panel is configured to evenly distribute light emitted from the SSL elements through a surface of the panel. With an edge-lit light-transmitting panel, light from the SSL elements is spread evenly through the panel by total internal reflection. Disruptions formed on the surface of the panel scatter incident light so that light is emitted from the surface of the panel.

SUMMARY

An exemplary lighting apparatus includes a flex-circuit, a frame, and a light-diffusive panel. The flex-circuit includes a first portion of a power bus disposed parallel to a first outer edge of the flex-circuit, a second portion of the power bus disposed parallel to a second outer edge of the flex-circuit, and a plurality of solid-state lighting (SSL) elements disposed and connected between the first and second portions of the power bus. The polarity of the first portion of the power bus is opposite polarity of the second portion of the power bus. The frame has a first side and an opposing second side. The first side of the frame includes a first surface to which a portion of the flex-circuit having the first portion of the power bus is attached, a second surface to which a portion of the flex-circuit having the SSL elements is attached, and a third surface to which a portion of the flex-circuit having the second portion of the power bus is attached. The light-diffusive panel has opposing first and second faces bounded by one or more sides. The first face abuts the first surface of the frame, and one or more of the sides face the second surface of the frame and light emitting portions of the plurality of SSL elements.

An exemplary method of making a lighting apparatus includes attaching a flex-circuit to a frame. The flex-circuit includes a first portion of a power bus disposed parallel to a first outer edge of the flex-circuit, a second portion the power bus disposed parallel to a second outer edge of the flex-circuit, and a plurality of solid-state lighting (SSL) elements disposed and connected between the first and second portions of the power bus. The polarity of the first portion of the power bus is opposite polarity of the second portion of the power bus. The frame includes a first side and an opposing second side. Attaching the flex-circuit to the frame includes attaching a portion of the flex-circuit having the first portion of the power bus to a first surface of the first side of the frame, attaching a portion of the flex-circuit having the SSL elements to a second surface of the first side of the frame, and attaching a portion of the flex-circuit having the second portion of the power bus to a third surface of the first side of the frame. The method further includes placing a light-diffusive panel in the frame. The light-diffusive panel has opposing first and second faces bounded by one or more sides, and in placing the light-diffusive panel the first face abuts the first surface of the frame, and one or more of the sides face the second surface of the frame and light emitting portions of the plurality of SSL elements.

The above summary is not intended to describe each disclosed embodiment. The figures and detailed description that follow provide additional example embodiments and aspects.

BRIEF DESCRIPTION OF THE DRAWINGS

Other aspects and advantages will become apparent upon review of the Detailed Description and upon reference to the drawings in which.

DETAILED DESCRIPTION

Figure 1:
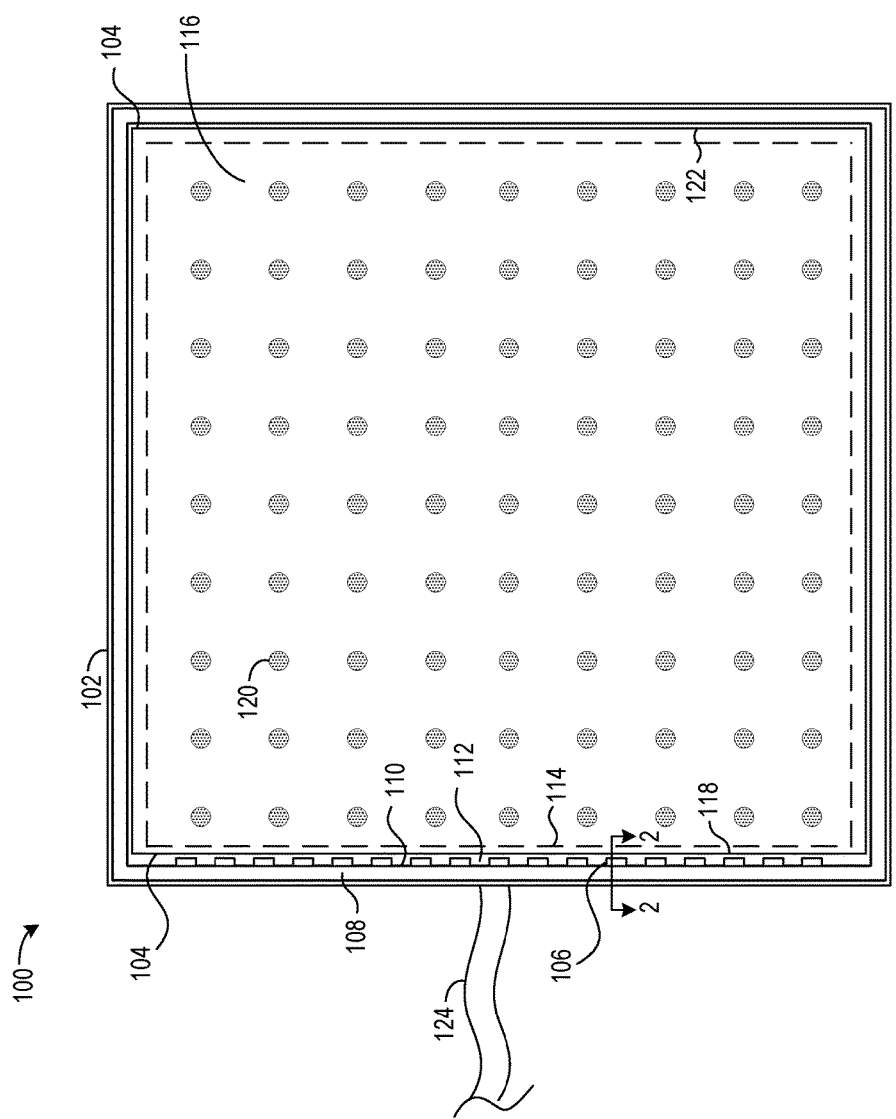
FIG. 1 shows a plan view of an exemplary SSL apparatus according to one implementation.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

This disclosure describes an SSL apparatus that provides even distribution of current to the SSL elements, is thin and economical, and efficiently dissipates heat from the SSL elements. The SSL apparatus is adaptable for various applications, including signage and general lighting.

The lighting apparatus includes a flex-circuit having a first portion of a power bus that is disposed proximate and runs parallel to a first outer edge of the flex-circuit, and a second portion of the power bus that is disposed proximate and runs parallel to a second outer edge of the flex-circuit. The polarity of the first portion of the power bus is opposite polarity of the second portion of the power bus. Solid-state lighting (SSL) elements are disposed and connected between the first and second portions of the power bus. The first and second portions of the power bus are metallic foil and have a large surface area relative to the SSL elements, providing even distribution of current and aiding in heat dissipation.

The lighting apparatus includes a frame to which the flex-circuit is attached. The frame has opposing first and second sides. A portion of the flex-circuit having the first portion of the power bus is attached to a first surface of the first side of the frame, a portion of the flex-circuit having the SSL elements is attached to a second surface of the first side of the frame, and a portion of the flex-circuit having the second portion of the power bus is attached to a third surface of the first side of the frame. The flex-circuit can include a dielectric backing that separates the conductive portions of the flex-circuit from the frame. Alternatively, the flex-circuit can include the power bus and SSL elements, and a separate dielectric layer can separate the conductive portions from the frame.

The lighting apparatus further includes a light-diffusive panel having opposing first and second faces bounded by one or more sides. The first face of the light-diffusive panel abuts the first surface of the frame, and one or more of the sides face the second surface of the frame and light emitting portions of the SSL elements. The configuration of the flex-circuit and the multiple surfaces of the side of the frame to which the flex-circuit is attached allow for the construction of a thin light panel while maintaining sufficient heat dissipation and current control.

FIG. 1 shows a plan view of an exemplary SSL apparatus 100 according to one implementation. The lighting apparatus generally includes a frame 102, a light-diffusive panel 104, and a flex-circuit having multiple SSL elements, one of which is shown as SSL element 106 (and any of which may be referenced as SSL element 106). The lighting arrangement can further include a reflector panel (not shown) that is attached to the frame and covers the light-diffusive panel. Light can be emitted from the side of the SSL apparatus not shown in the plan view. Power can be supplied to the flex-circuit via power cable 124 and any connection to the flex-circuit suitable for the desired application.

The frame 102 has a first side and an opposing second side. In the plan view only the first side of the frame is visible. In one implementation, the frame metallic, such as extruded aluminum. Other materials may be suitable in other implementations. The first side of the frame to which the flex-circuit is attached includes multiple surfaces, which allows the flex-circuit to be folded and thereby reduce the thickness of the SSL lighting apparatus.

The flex-circuit includes a power bus having two portions and SSL elements connected between the portions of the power bus. A first portion of the power bus is disposed proximate and parallel to a first outer edge of the flex-circuit, and a second portion the power bus is disposed proximate and parallel to a second outer edge of the flex-circuit. The first portion 108 of the power bus is attached to a first surface on the first side of the frame. The portion of the flex-circuit having the SSL elements is attached to a second surface of the frame, which is shown as element 110. The second portion 112 of the power bus is attached to a third surface on the first side of the frame. Dashed line 114 represents the edge of the surface of the frame to which the portion 112 of the flex-circuit is attached.

The light-diffusive panel 104 has opposing first and second faces that are smooth, transparent and bounded by one or more sides. In the plan view, face 116 is shown. The light-diffusive panel is attached to the frame such that light from the SSL elements 116 is emitted at side 118 of the light-diffusive panel. One or both faces of the light-diffusive panel have multiple disruptions, an exemplary one of which is shown as disruption 120 on face 116. With an edge-lit lighting apparatus, light from the SSL elements is spread evenly through the light-diffusive panel by total internal reflection. The disruptions formed on the surface of the panel scatter incident light so that light is emitted from the panel.

In one implementation, the light-diffusive panel is made from a transparent thermoplastic such as polymethyl methacrylate (PMMA or "acrylic glass"). In the illustrated example, the light-diffusive panel 102 is rectangular and has four sides. However, the light-diffusive panel may be any polygon or a shape bounded by one or more curved sides, such as a circle, ellipse, or an irregular shape.

The frame 102 can completely surround the light-diffusive panel 104 as shown in FIG. 1 and held in place by a reflector panel (not shown). In other implementations (not shown), fewer than all of the sides of the light-diffusive panel or less than the entire perimeter of light-diffusive panel may be attached to the frame.

The exemplary lighting apparatus 100 includes SSL elements 106 along one side 118 of the light-diffusive panel 104. In other implementations, SSL elements can be disposed along multiple sides of the light-diffusive panel. For example, the flex-circuit can be attached to the four sections of the frame 102, with light emitted from SSL elements (not shown) on a segment of the flex-circuit directed at side 122 of the light-diffusive panel in addition to the light directed at side 118 of the light-diffusive panel.

The flex-circuit can be composed of multiple segments in some implementations. For example, the segments of the flex-circuit can be attached to the four sides of the frame 102, respectively, and the segments of the flex-circuit can be connected one to another at the corners of the frame.

Figure 2:
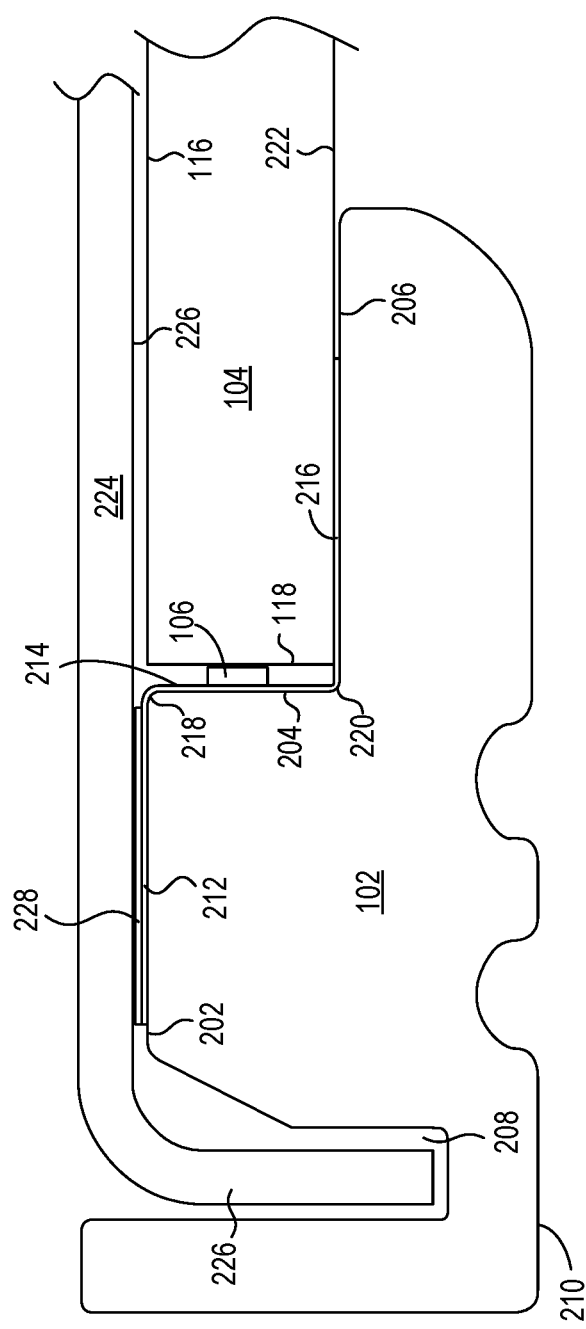
FIG. 2 is a partial cross-sectional view of a portion of the SSL apparatus of FIG. 1 taken in direction of cross-section lines 2-2.

FIG. 2 is a partial cross-sectional view of a portion of the SSL apparatus of FIG. 1 taken in direction of cross-section lines 2-2. The frame 102 includes first and second opposing sides. The first side includes first surface 202, second surface 204, third surface 206, and groove 208. The second side 210 is generally opposite the first side and forms the side of the frame from which light is emitted by the SSL apparatus 100 (FIG. 1). In a closed frame, such as the polygonal frame of FIG. 1, the second surface forms a polygon contained within the polygon formed by the first surface, and the third surface forms a polygon contained within the polygon formed by the second surface.

In an exemplary implementation, the flex-circuit includes a flexible dielectric substrate and a pattern of copper or aluminum foil attached to the substrate. The substrate can be polyamide or polyimide, for example. Instead of using polyamide or polyimide for the substrate, the substrate may be polyethylene terephthalate (PET), polyelectrolyte multi-layers (PEMs), or high-density polyethylene (e.g., TYVEK®), for example. In some other implementations, the flex-circuit need not include a substrate, and a separate dielectric layer, for example, a suitable double-sided tape can be attached to the frame and between the frame and the flex-circuit. Portions 212, 214, and 216 of the flex-circuit are attached to the first, second, and third surfaces 202, 204, and 206 of the frame 104. In one implementation, the flex-circuit can be adhered to the frame by a pressure-sensitive adhesive (PSA). The first, second, and third surfaces can be planar and are disposed in different planes. The corners 218 and 220 at which the surfaces intersect have a small radius (e.g., 0.10 inch) in order to aid in attachment of the flex-circuit to the frame. One or both of the first surface 202 and the third surface 206 can intersect the second surface 204 at right angles.

The shape of the frame permits a large power bus on a flex-circuit without increasing the thickness of the frame and thereby the thickness of the SSL apparatus. The arrangement of the first, second, and third surfaces 202, 204, and 206 of the frame impose a z-bend on the portions 212, 214, and 216 of the flex-circuit, which allows the large power bus. In an exemplary implementation, an SSL lighting apparatus can be made as thin as approximately 0.25" by employing a 0.25" thick aluminum frame and a 0.125" thick light-diffusive panel.

The cross-sectional view of FIG. 2 shows the opposing faces 116 and 222 of the light-diffusive panel 104. Face 222 abuts the surface 206 of the frame (with portion 216 of the flex-circuit between the light-diffusive panel and the frame), and side 118 of the light-diffusive panel is positioned to receive light emitted from the SSL element 106.

The SSL apparatus can further include a reflector panel 224. The reflector panel can be metallic to aid in heat dissipation. The reflector panel covers the surface 116 of the light-diffusive panel and has a reflective surface 226 that reflects light from surface 116 back into the panel. In order to maintain internal reflection and evenly distribute light throughout the panel 104, a small gap is present between the reflector 224 and the surface 116. A rough texture (not shown) on the reflective surface of the reflector panel may provide a sufficient gap. The reflector panel 224 may be a diffusive reflector to promote even dispersion of light from the panel. An additional dielectric layer 228 can be disposed between the portion 212 of the flex-circuit and the reflector panel to protect against an electrical connection between the reflector and the flex-circuit if the metallic foil of the power bus on portion 212 is exposed. The reflector panel 224 can be aligned to the frame with groove 208 of the frame enveloping flange 226 of the reflector panel. The reflector panel can be permanently attached to the frame or attached such that the reflector panel is removable according to application requirements.

Figure 3:
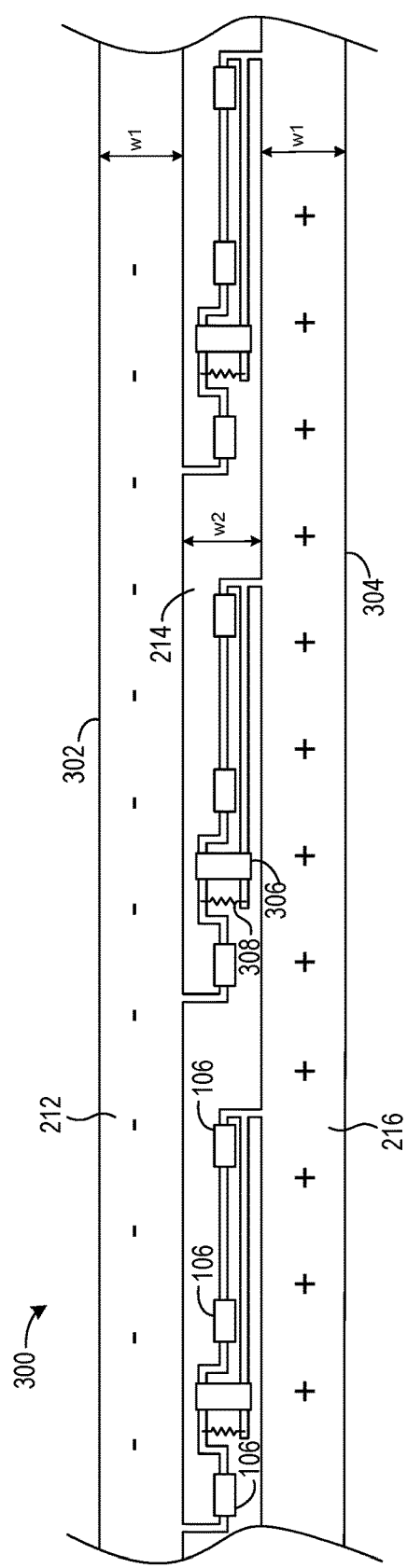
FIG. 3 shows an exemplary flex-circuit employed in the SSL lighting apparatus of FIG. 1.

FIG. 3 shows an exemplary flex-circuit 300 employed in the SSL lighting apparatus of FIG. 1. The flex-circuit can include a flexible dielectric substrate and conductive foil attached to the substrate and patterned to power the SSL elements. For example, the substrate can be polyamide, polyimide, PET, PEMs, or high-density polyethylene, for example, and the conductive foil can be copper or aluminum. The flex-circuit includes a first portion 212 of a power bus disposed proximate and parallel to a first outer edge 302 of the flex-circuit, a second portion 216 of the power bus disposed proximate and parallel to a second outer edge 304 of the flex-circuit, and SSL elements 106 disposed on the flex-circuit and connected between the first and second portions of the power bus. In the exemplary flex-circuit, the polarity of the first portion of the power bus is opposite polarity of the second portion of the power bus.

The SSL elements are arranged in groups of three on the exemplary flex-circuit. Each group of three SSL elements is connected to a current control circuit and a resistor for maintaining a constant current to the connected SSL elements. For example, current control circuit 306 and resistor 308 regulate current to one group of SSL elements. Those skilled in the art will recognize that arrangements of SSL elements and current regulator circuitry can vary according to implementation requirements. For example, the current can be centrally regulated for all the SSL elements at the power supply.

The large surface area and arrangement of the portions of the power bus provide ample current carrying capacity, and in combination with the frame enable a thin SSL apparatus. In an exemplary implementation, the power bus includes 2 oz. copper foil, and the width (w1) of the portions can be over 0.25 in. In comparison, the portion 214 of the flex-circuit having the SSL elements can be approximately 0.125 in. In some implementations, the flex-circuit can be coated with a hydrophobic coating, such as through plasma polymerization, in order to protect the circuitry from moisture.

Figure 4:
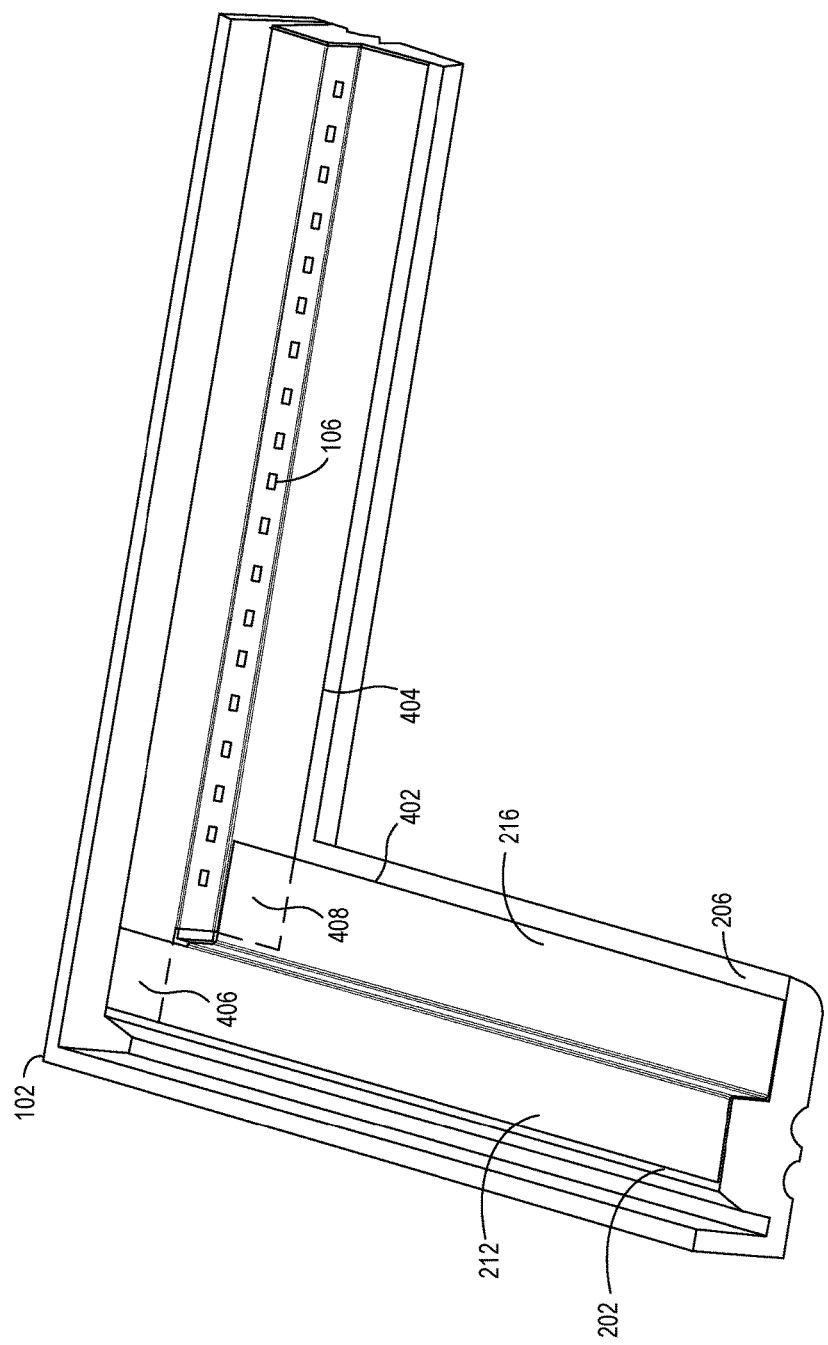
FIG. 4 shows a perspective view of a portion of a frame and flex-circuit.

FIG. 4 shows a perspective view of a portion of a frame 102 and flex-circuit. The flex-circuit includes segments 402 and 404, and segment 404 includes SSL elements 106. The segments are attached to the frame as described above. For example, portion 212 of segment 402 is attached to surface 202 of the frame, and portion 216 is attached to the surface 206 of the frame.

The power bus on segments 402 and 404 of the flex-circuit is connected at the corner of the frame 102. In an exemplary implementation, the power bus portion of segment 402 overlaps the power bus portion of segment 404. In some implementations, portions 406 and 408 are not backed by the flexible dielectric substrate that underlies the rest of the segment in order to electrically connect to the portions of the power bus in segment 404. The lap joint can be spot or seam welded to secure the connection. In other implementations, portions 406 and 408 are backed by a dielectric substrate, and the power bus of the two segments can be connected by way of through-holes through portions 406 and 408 and a solder joint that connects the power bus of segment 402 to the power bus on segment 404.

Figure 5:
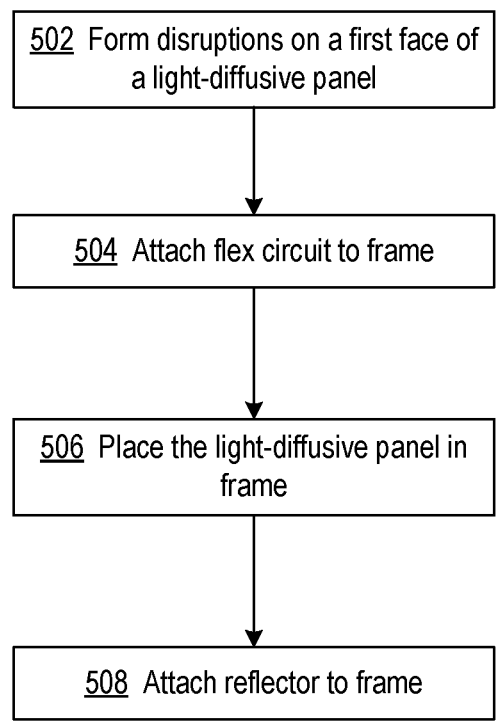
FIG. 5 is a flowchart of an exemplary process for making an SSL apparatus.

FIG. 5 is a flowchart of an exemplary process for making an SSL apparatus. The order of operations and the particular operations performed may vary according to the type of lighting apparatus. At block 502, disruptions are formed in a light-diffusive panel. The disruptions may be formed by laser etching a pattern of dots on one of the faces of the light diffusive panel, for example. For many signage applications, emission of an even level of light from the entire surface of the light-diffusive panel may be desirable. Different patterns of disruptions on light-diffusive panels may be used to different effect. One pattern that has been found to be particularly useful is an edge-to-edge pattern of disruptions formed on the surface of the panel.

At block 504, a flex-circuit is attached to a frame. The flex-circuit includes a power bus in which a first portion is disposed proximate and parallel to a first outer edge of the flex-circuit and a second portion is disposed proximate and parallel to a second outer edge of the flex-circuit. The flex-circuit further includes SSL elements disposed and connected between the first and second portions of the power bus.

The frame includes a first side and an opposing second side. In attaching the flex-circuit to the frame, the portion of the flex-circuit having the first portion of the power bus is attached to a first surface of the first side of the frame, the portion of the flex-circuit having the SSL elements is attached to a second surface of the first side of the frame, and the portion of the flex-circuit having the second portion of the power bus is attached to a third surface of the first side of the frame. A pressure sensitive adhesive can be used to attach the flex-circuit to the frame.

At block 506, a light-diffusive panel is placed within the frame. The light-diffusive panel has opposing first and second faces bounded by one or more sides. The first face of the light-diffusive panel abuts the first surface of the frame, and one or more of the sides face the second surface of the frame and light emitting portions of the plurality of SSL elements.

A reflector panel is attached to the frame at block 508. One surface of the reflector panel is highly reflective and faces a surface of the light-diffusive panel. The reflector panel can be attached to the frame by an adhesive, screws, rivets, weld joints, pressure fittings or any other means suitable for the desired application.

Though aspects and features may in some cases be described in individual figures, it will be appreciated that features from one figure can be combined with features of another figure even though the combination is not explicitly shown or explicitly described as a combination.

The present invention is thought to be applicable to a variety of lighting applications. Other aspects and embodiments will be apparent to those skilled in the art from consideration of the specification and practice disclosed herein. It is intended that the disclosed apparatus and method be considered as examples only, with a true scope of the invention being indicated by the following claims.

What is claimed is:

1. A lighting apparatus, comprising:
   a flex-circuit that includes a first portion of a power bus disposed parallel to a first outer edge of the flex-circuit, a second portion of the power bus disposed parallel to a second outer edge of the flex-circuit, and a plurality of solid-state lighting (SSL) elements disposed and connected between the first and second portions of the power bus, wherein polarity of the first portion of the power bus is opposite polarity of the second portion of the power bus;
   a frame having a first side and an opposing second side, the first side including:
      a first surface to which a portion of the flex-circuit having the first portion of the power bus is attached,
      a second surface to which a portion of the flex-circuit having the SSL elements is attached, and
      a third surface to which a portion of the flex-circuit having the second portion of the power bus is attached; and
   a light-diffusive panel having opposing first and second faces bounded by one or more sides, wherein the first face abuts the first surface of the frame, and at least one of the one or more sides face the second surface of the frame and light emitting portions of the plurality of SSL elements.

2. The lighting apparatus of claim 1, wherein the second surface of the frame intersects the first surface of the frame.

3. The lighting apparatus of claim 2, wherein the third surface of the frame intersects the second surface of the frame.

4. The lighting apparatus of claim 1, wherein the second surface of the frame is perpendicular to the first surface of the frame.

5. The lighting apparatus of claim 1, wherein the third surface of the frame is perpendicular to the second surface of the frame.

6. The lighting apparatus of claim 1, wherein the first and third surfaces of the frame are perpendicular to the second surface of the frame.

7. The lighting apparatus of claim 1, wherein the flex-circuit includes a substrate that is one of polyamide, polyimide, polyethylene terephthalate (PET), polyelectrolyte multilayers (PEMs), or high-density polyethylene.

8. The lighting apparatus of claim 1, wherein the first and second portions of the power bus are one of copper foil or aluminum foil.

9. The lighting apparatus of claim 1, wherein the light-diffusive panel has a plurality of disruptions on the second face.

10. The lighting apparatus of claim 9, further comprising a reflector panel attached to the frame, wherein the second face of the light-diffusive panel faces a reflective surface of the reflector panel.

11. The lighting apparatus of claim 10, wherein the frame has a groove in the first side of the frame, and the reflector panel has a portion enveloped in the groove.

12. The lighting apparatus of claim 1, wherein the frame is a metallic frame.

13. The lighting apparatus of claim 1, wherein the frame includes aluminum.

14. The lighting apparatus of claim 1, wherein the frame surrounds the light-diffusive panel.

15. The lighting apparatus of claim 1, wherein the frame is polygonal.

16. The lighting apparatus of claim 15, wherein the flex-circuit includes a plurality of segments, the frame includes a plurality of sections, and each segment is attached to one of the sections of the frame.

17. The lighting apparatus of claim 16, wherein the plurality of SSL elements are disposed on one or more of the segments of the flex-circuit.

18. The lighting apparatus of claim 1, further comprising a hydrophobic coating that covers the first and second portions of the power bus, the plurality of SSL elements, and connections between the first and second portions of the power bus and the plurality of SSL elements.

19. A method of making a lighting apparatus, comprising:
   attaching a flex-circuit to a frame, the flex-circuit including a first portion of a power bus disposed parallel to a first outer edge of the flex-circuit, a second portion the power bus disposed parallel to a second outer edge of the flex-circuit, and a plurality of solid-state lighting (SSL) elements disposed and connected between the first and second portions of the power bus, wherein polarity of the first portion of the power bus is opposite polarity of the second portion of the power bus;
   wherein the frame includes a first side and an opposing second side;
   wherein the attaching includes:
      attaching a portion of the flex-circuit having the first portion of the power bus to a first surface of the first side of the frame,
      attaching a portion of the flex-circuit having the SSL elements to a second surface of the first side of the frame, and
      attaching a portion of the flex-circuit having the second portion of the power bus to a third surface of the first side of the frame; and
   placing a light-diffusive panel in the frame, wherein the light-diffusive panel has opposing first and second faces bounded by one or more sides, and in placing the light-diffusive panel in the frame, the first face abuts the first surface of the frame, and at least of the one or more sides face the second surface of the frame and light emitting portions of the plurality of SSL elements.

20. The method of claim 19, further comprising attaching a reflector panel to the frame such that the second face of the light-diffusive panel faces a reflective surface of the reflector panel.

* * * * *